Nov. 1, 1960  W. R. GARRETT  2,958,088
BENDABLE REINFORCED PIPE WIPER
Filed Nov. 19, 1956  2 Sheets-Sheet 1
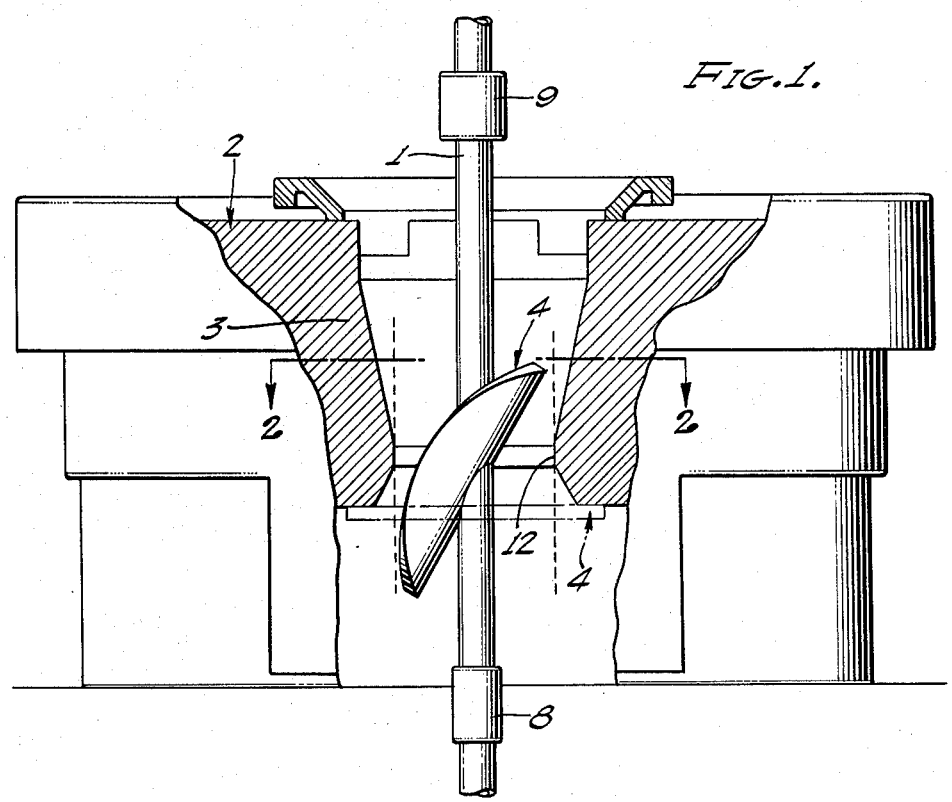
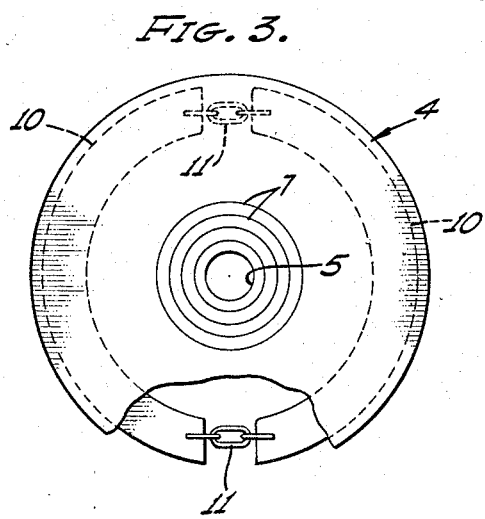
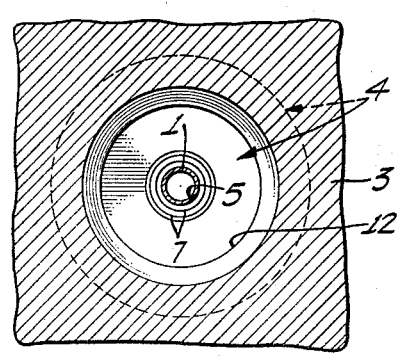
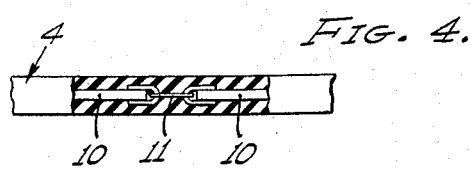
WILLIAM R. GARRETT
INVENTOR.
BY
*Alenta Hambly*
ATTORNEY Nov. 1, 1960 W. R. GARRETT 2,958,088
BENDABLE REINFORCED PIPE WIPER
Filed Nov. 19, 1956 2 Sheets-Sheet 2

WILLIAM R. GARRETT
INVENTOR.

BY
ATTORNEY

United States Patent Office 2,958,088
Patented Nov. 1, 1960

2,958,088
BENDABLE REINFORCED PIPE WIPER

William R. Garrett, Long Beach, Calif., assignor to Borg-Warner Corporation, Chicago, Ill., a corporation of Illinois Filed Nov. 19, 1956, Ser. No. 622,963

7 Claims. (Cl. 15—210)

The present invention relates to pipe wipers, and more particularly to an improved pipe wiper of a type generally employed for wiping oilwell drill pipes.

In the removal of "stands" of drill pipe from a well, pipe wipers are commonly employed beneath the bushings to remove drilling mud from the drill pipe as it is elevated through the bushings for disconnection of the stands. This is done to prevent the mud from clinging to the pipe and running off of the pipe on to the derrick floor when the pipe is racked, as would otherwise cause a dangerous and undesirable working condition for the drilling crew.

The installation of such pipe wipers has heretofore involved problems, however, particularly when so-called solid or one piece master bushings are employed. It is a difficult job to install a split pipe wiper about the pipe beneath the master bushing, since this vicinity is not readily accessible. Moreover, the insertion of a pipe wiper down through the master bushing presents a problem since the wiper must be of such dimensions as to extend beneath the bushing so that it will engage therewith and will not ride up with the pipe.

In addition, the wiper must have sufficient rigidity to enable it to engage beneath the bushing without bending or flexing to such an extent as to be capable of being pulled through the bushing along with the pipe.

Pipe wipers of the pipe here involved are subjected to severe punishment as a pipe is elevated therethrough, since the pipe joints which are larger than the pipe itself, as well as any protectors which may be mounted on the pipe, are all pulled up through the wipers and subjected to a wiping action, so that the wiper is repeatedly subjected to stretching by such joints and/or protectors as the pipe is elevated at a relatively high rate of speed. Therefore, it is of importance that a pipe wiper have substantial surface contact with the under side of the bushing to prevent the wiper from being subjected to undue strain and pressure in localized areas as is the case where the wipers are of such a shape as to provide only segmental areas about the margin for engagement beneath the bushing.

A primary object of the invention is to provide a pipe wiper which obviates the foregoing problems and which is easy to manufacture and install as well as durable and effective during use.

Another object is to provide a pipe wiper which is of such a size as to afford substantial surface contact about its outer margin with the under side of a master bushing, but which is readily mountable on the pipe and insertable through the opening in the master bushing.

In accordance with the preceding objective, the novel and improved wiper hereof is so constructed as to be foldable or flexible on a diametrical line so that it is generally elliptical in its projected form with the minor axis of a length less than the diameter of the opening through the master bushing beneath which the wiper is to be disposed. With the wiper so folded, it may then be tipped or cocked on the major axis of the ellipse until the projected form of the wiper is generally circular, having a diameter less than the diameter through the opening of the master bushing. Thereupon, the wiper may be passed over the end of the drill pipe, and it will readily move downwardly over the pipe through the master bushing.

As an example, a flat annular wiper having a diameter of approximately 16 inches, when folded or flexed on a diametrical line so that its two halves are disposed at an angle of approximately 90 degrees thus forming an ellipse in its projected form, will have a minor axis of approximately 12 inches; and when the wiper is tipped on this minor axis at an angle from a horizontal plane of approximately 45 degrees, so that in its projected form the major axis is reduced to approximately 12 inches, it may be inserted through a bushing opening considerably smaller than the actual diameter of the pipe wiper. The present wiper, as well as wipers in general, is composed of rubber or the like, and upon release of the wiper from its folded and tipped condition, the inherent resilience of the wiper material will cause the wiper to snap back into a flat normal relation to the drill pipe and the diameter of the wiper will be too large to permit its passage back up through the master bushing.

Since the purpose of the wiper is to closely fit and wipe the surface of a pipe, its joints and any protectors or the like which may be disposed thereon, the central area of the wiper is so constructed as to be flexible and such flexibility will permit the folded and tipped or cocked wiper to be moved downwardly on the pipe through the master bushing, but the marginal area must be substantially rigid.

Still another object, therefore, is to provide a pipe wiper as aforesaid, having generally semi-circular reinforcing elements molded into its outer peripheral portion, these reinforcing elements preferably being hingedly or flexibly interconnected, whereby the wiper is foldable as previously referred to but still has sufficient marginal rigidity and strength as to stand up under the severe conditions to which it is subjected as pipe strings are run therethrough into and out of a well, as is done many times during the course of drilling.

Further objects and advantages will be hereinafter described or will become apparent to those skilled in the art and the novel features of the invention will be defined in the appended claims.

In the accompanying drawings:

Figure 1 is a view partly in side elevation and partly broken away and shown in section of a conventional rotary well drilling table having a drill pipe extending therethrough, and showing in full lines a pipe wiper embodying the invention folded and tipped for enabling its being moved down through the master bushing, and showing in broken lines the position assumed by the wiper beneath the master bushing;

Figure 2 is a fragmentary view in section, as taken on the line 2—2 of Figure 1;

Figure 3 is a plan view of one form of pipe wiper made in accordance with the invention, with a portion of the wiper body broken away to disclose the hinge structure;

Figure 4 is an enlarged fragmentary view in elevation showing the hinge structure of Figure 3;

Figure 5:
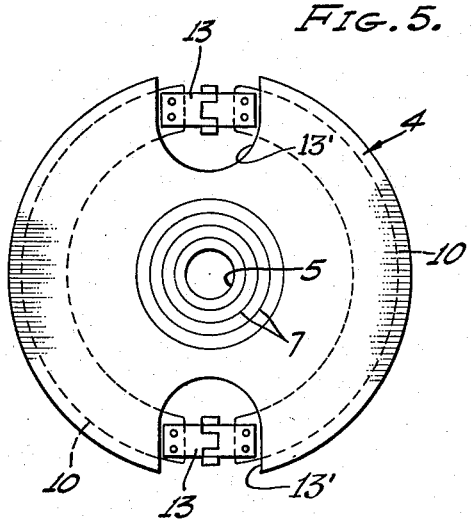
Figure 5 is a plan view of a modified form of hinged pipe wiper embodying the invention.

Like reference characters in the several figures of the drawing and in the following description designate corresponding parts, wherein 1 generally denotes a drill pipe which is vertically extended through the central opening of a rotary drill table 2 having a solid or one-piece master bushing 3, from which the conventional Kelly bushing (not shown) has been removed to enable elevation and lowering of the pipe 1. As the pipe 1 is elevated from the well, which is normally filled with so-called drilling mud during the drilling operation, it would ordinarily be coated with the mud, and accordingly, a pipe wiper is generally utilized to strip the pipe of such mud.

An improved pipe wiper made in accordance with the invention and generally designated 4 is shown in Figure 1 in the position and condition that it would assume while being moved downwardly over the pipe 1 to the position shown in broken lines in Figure 1.

The wiper 4 is generally flat and annular in form, having a central opening 5 therethrough, so that the inner periphery of the wiper 4 is adapted to closely engage about the drill pipe 1 to wipe the same clear of mud.

In the area midway between its inner and outer peripheries, the wiper body, which is preferably composed of rubber or other suitable flexible material, may be thinned in the conventional manner so as to permit the central portion of the wiper to more readily flex as the drill pipe 1 moves upwardly or downwardly therethrough.

In addition, if desired, the upper and/or lower surface of the wiper 4 may be provided with a series of graduated ring markings 7 denoting different pipe sizes with which the wiper may be employed upon enlarging the hole through the wiper to any selected ring mark.

As has been previously mentioned, the drill pipe 1 is made up of stands or sections joined together by enlarged collars or joints as at 8, and additionally, the pipe may be provided with a number of cylindrical protectors 9 spaced along its length. Both the protectors 9 and joints or collars 8 create protuberances which, when the pipe is being elevated at a relatively high rate of speed, subject the pipe wiper 4 to severe punishment and tend to carry the wiper 4 upwardly along with the pipe. Accordingly, in order to provide the wiper with sufficient marginal rigidity in the area where the wiper engages beneath the master bushing, thus to prevent such upward movement of the wiper, reinforcing means are provided about the outer margin of wiper 4.

Referring to Figures 3 and 4, the reinforcing means is shown as comprising a pair of semi-circular rigid elements 10 which are preferably molded in the wiper in opposed relation to one another at opposite sides of a diametrical line across the wiper, with the opposing ends of the elements 10 hingedly interconnected as by means of chain links 11. Preferably, a link is severed and mounted on each of the reinforcing elements 10 as by welding, with a hinge link interconnecting the two severed and welded links.

Accordingly, it will be noted that on a diametrical line extending across the chain link hinge structures at opposite sides of the wiper 4, the wiper may be folded, and upon such folding, the projected form of the wiper 4 will be that of an ellipse having its major axis extending across the hinged structure.

Therefore, upon folding or flexing the wiper 4 on the hinges 11 and subsequently tipping the wiper 4 from a horizontal plane, the projected form of the wiper then becomes circular, but of a size substantially less than the actual size of the wiper itself. Thus, the wiper 4 may be moved downwardly over the pipe 1 through the smallest opening 12 in the master bushing 3, as is shown in full lines in Figure 1, this opening 12 being substantially smaller in diameter than the diameter of the pipe wiper 4. When the pipe wiper passes below the opening through the master bushing 3, it will then flex back to a normal position so that it will engage about its outer margin beneath the master bushing, as is shown in broken lines in Figure 1.

Figure 6:
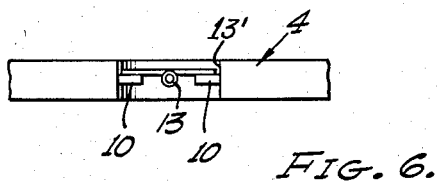
Figure 6 is an enlarged fragmentary view in elevation showing the hinge structure of Figure 5.

Referring now to Figures 5 and 6, a modified embodiment of the invention is shown wherein a conventional hinge 13 is interposed between the opposing ends of the semi-circular reinforcing elements 10 these hinges 13 having their respective leaves riveted or otherwise suitably secured to the elements 10. In this embodiment, since the wiper 4 must fold or flex on a diametrical line across the hinge pins, the wiper is preferably notched as at 13' to provide a clearance space for the hinges. Such notching of the wiper, however, does not materially decrease the overall area of abutment between the wiper 4 and the under side of the master bushing 3, and the wiper will function similarly to that previously described.

Figure 7:
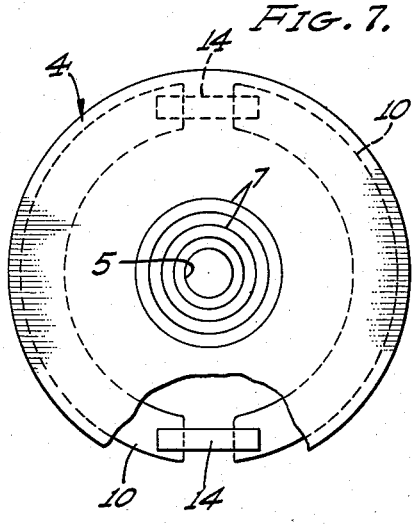
Figure 7 is a view in elevation of a further modified form of pipe wiper embodying the invention.
Figure 8:
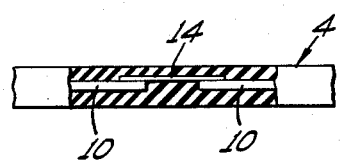
Figure 8 is an enlarged fragmentary view in elevation showing the modified means for permitting folding of the pipe wiper of Figure 7.

In Figures 7 and 8 another modified embodiment is shown wherein a strip of pliant spring metal designated 14 bridges the space between the reinforcing elements 10, these strips 14 being welded or otherwise suitably secured at their respective ends to the opposing ends of the reinforcing element 10.

Figure 9:
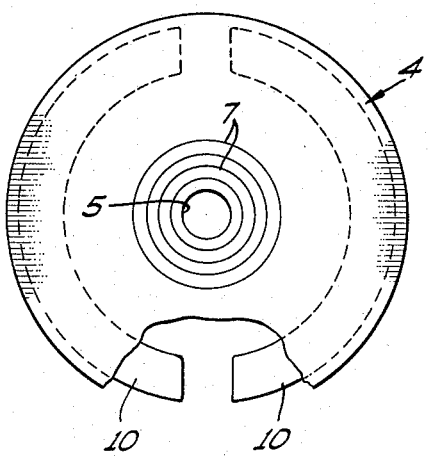
Figure 9 is a plan view of still another modified form of pipe wiper made in accordance with the invention.
Figure 10:
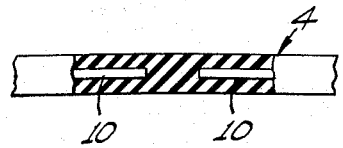
Figure 10 is an enlarged fragmentary view in elevation showing the structure enabling folding of the pipe wiper of Figure 9.

Still another modified form of the invention is shown in Figures 9 and 10, wherein there is no hinge connection between the opposing ends of the reinforcing elements 10 themselves but instead, the flexible material of the wiper 4, in effect, constitutes a flexible or pliant hinge means between these elements 10.

The hinged connection between the reinforcing elements 10 may have still other specific forms without departing from the spirit of the invention as long as the resultant structure is one in which, as in each of the herein disclosed embodiments, the pipe wiper may be flexed to provide a generally elliptical projected form as has been herein described.

I claim:

1. A pipe wiper of the class described, comprising an annular disc of flexible material having a central pipe-opening therethrough, said disc having reinforcing means at its outer periphery, said reinforcing means comprising a pair of arcuate rigid elements embedded in said disc and respectively disposed at opposite sides of a diametrical line across the disc, and said elements respectively having ends terminating in opposed spaced relation to the ends of the other element at opposite sides of said diametrical line.

2. A pipe wiper of the class described, comprising an annular disc of flexible material having a central pipe-opening therethrough, said disc having reinforcing means at its outer periphery, said reinforcing means comprising a pair of arcuate substantially semicircular rigid elements embedded in said disc and respectively disposed at opposite sides of a diametrical line across the disc, and one of said elements having its ends terminating in opposed spaced relation to the adjacent ends of the other element at opposite sides of said diametrical line.

3. A pipe wiper as defined in claim 2 including a plurality of chain links extending between the opposed ends of said elements, with one link connected to one reinforcing element at one side of said diametrical line and another link connected to the other reinforcing element at the other side of said diametrical line.

4. A pipe wiper as defined in claim 2 including a pair of spring metal strips bridging said diametrical line and interconnected at their opposite ends with said reinforcing elements.

5. A pipe wiper as defined in claim 2, including pairs of hinge leaves respectively connected to said reinforcing elements at the opposing ends of the latter, and hinge pins pivotally interconnecting said pairs of hinge leaves on said diametrical line.

6. A pipe wiper as defined in claim 2, including pairs of hinge leaves respectively connected to said reinforcing elements at the opposing ends of the latter, and hinge pins pivotally interconnecting said pairs of hinge leaves on said diametrical line, said disc having marginal notches in the vicinity of said diametrical line, with said hinge pins and contiguous portions of said hinge leaves disposed in said notches.

7. A pipe wiper of the class described, adapted to encircle a pipe for wiping the same, comprising an annular disc having a central pipe opening therethrough, rigid marginal reinforcing elements embedded in said disc at opposite sides of a diametrical line thereacross, said reinforcing elements having portions disposed in opposed spaced relation at opposite sides of said diametrical line, said reinforcing means comprising a pair of semi-circular members extending circumferentially of the disc at its outer margin, and flexible means interconnected with said opposed portions across said diametrical line for allowing said disc to be flexed on said diametrical line.

References Cited in the file of this patent

UNITED STATES PATENTS

| | | |
|---|---|---|
| 2,514,817 | Wheaton et al. | July 11, 1950 |
| 2,559,782 | Meek | July 10, 1951 |
| 2,620,504 | Slater | Dec. 9, 1952 |